(12) United States Patent
Liu

(10) Patent No.: US 9,832,377 B2
(45) Date of Patent: Nov. 28, 2017

(54) DATA ACQUIRING METHOD AND ELECTRONIC DEVICE THEREOF

(71) Applicant: Lenovo (Beijing) Co., Ltd., Beijing (CN)

(72) Inventor: Yonghua Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 47 days.

(21) Appl. No.: 14/458,855

(22) Filed: Aug. 13, 2014

(65) Prior Publication Data

US 2015/0092072 A1    Apr. 2, 2015

(30) Foreign Application Priority Data

Sep. 29, 2013    (CN) .......................... 2013 1 0456122

(51) Int. Cl.
*H04N 5/232*    (2006.01)
*H04N 5/225*    (2006.01)
*H04N 5/349*    (2011.01)

(52) U.S. Cl.
CPC ....... *H04N 5/23232* (2013.01); *H04N 5/2254* (2013.01); *H04N 5/349* (2013.01)

(58) Field of Classification Search
None
See application file for complete search history.

(56) References Cited

U.S. PATENT DOCUMENTS

| 7,123,292 | B1 * | 10/2006 | Seeger ..................... G03B 5/02 |
| | | | 348/218.1 |
| 7,589,779 | B2 | 9/2009 | Lyons et al. |
| 7,868,927 | B2 | 1/2011 | Motomura et al. |
| 7,973,827 | B2 | 7/2011 | Motomura et al. |

(Continued)

FOREIGN PATENT DOCUMENTS

| CN | 101034710 A | 9/2007 |
| CN | 101779472 A | 7/2010 |

(Continued)

OTHER PUBLICATIONS

First Chinese Office Action regarding Application No. 201310456122.7 dated May 19, 2017. English translation provided by http://globaldossier.uspto.gov.

*Primary Examiner* — Mark T Monk
(74) *Attorney, Agent, or Firm* — Harness, Dickey & Pierce, P.L.C.

(57) ABSTRACT

The disclosure discloses a data acquiring method and an electronic device thereof. The electronic device comprises an image acquisition unit, the image acquisition unit comprises a light-transparent module and a sensing module, and there is a first position relationship between the light-transparent module and the sensing module. The method comprises: obtaining a first image of a target scene acquired by the image acquisition unit, wherein an image resolution of the first image is first resolution; adjusting the image acquisition unit based on preset moving parameters; obtaining a second image of the target scene acquired by the image (Continued)

acquisition unit; obtaining a third image by processing the first image and the second image based on the moving parameters, wherein image resolution of the third image is third resolution and the third resolution is greater than the first resolution.

12 Claims, 4 Drawing Sheets

(56) References Cited

U.S. PATENT DOCUMENTS

| | | | |
|---|---|---|---|
| 8,081,251 B2 * | 12/2011 | Kido | G03B 17/14 |
| | | | 348/333.11 |
| 2007/0133856 A1 * | 6/2007 | Dutta-Choudhury | G06K 9/00134 |
| | | | 382/133 |
| 2008/0253685 A1 * | 10/2008 | Kuranov | G06T 3/4038 |
| | | | 382/284 |
| 2009/0251554 A1 | 10/2009 | Kido et al. | |
| 2010/0149381 A1 | 6/2010 | Motomura et al. | |
| 2010/0194911 A1 | 8/2010 | Motomura et al. | |

FOREIGN PATENT DOCUMENTS

| | | |
|---|---|---|
| CN | 101849406 A | 9/2010 |
| JP | 2011097473 A | 5/2011 |

\* cited by examiner

DATA ACQUIRING METHOD AND ELECTRONIC DEVICE THEREOF

This application claims priority to Chinese Patent Application No.201310456122.7, entitled "Data acquiring method and electronic device thereof" and filed with the Chinese Patent Office on Sep. 29, 2013 which is hereby incorporated by reference in its entirety.

TECHNICAL FIELD

The disclosure relates to the field of image processing, in particular to a data acquiring method and electronic device thereof.

BACKGROUND

At present, due to requirements for ultrathin portable devices such as a mobile phone and a PAD, when a camera function of the portable devices is used, normally, photosensitive area of a sensor is limited to meet the requirements of ultrathin size and portability for a camera, which leads to a limitation in improving image resolution acquired by the camera.

SUMMARY

In view of this, the disclosure is to provide a data acquiring method and electronic device thereof to solve a technical problem of conventional technology that image data resolution acquired by a camera is relative low due to the limitation on photosensitive area of the sensor in the camera.

The disclosure provides a data acquiring method applied to an electronic device, the electronic device includes an image acquisition unit, the image acquisition unit includes a light transparent module and a sensing module, and there is a first position relationship between the light-transparent module and the sensing module. The method includes:

obtaining a first image of a target scene acquired by the image acquisition unit, where image resolution of the first image is first resolution;

adjusting the image acquisition unit based on preset moving parameters;

obtaining a second image of the target scene acquired by the image acquisition unit; and obtaining a third image by processing the first image and the second image based on the moving parameters, where image resolution of the third image is third resolution and the third resolution is greater than the first resolution.

In the method, preferably, the process of adjusting the image acquisition unit based on preset moving parameters includes:

adjusting, based on the preset moving parameters, a relative position between the light-transparent module and the sensing module in the image acquisition unit, thereby a second relationship is generated between the light-transparent module and the sensing module.

In the method, preferably, photosensitive area of the sensing module is greater than light-transparent area of the light-transparent module.

In the method, preferably, the process of adjusting the image acquisition unit based on the preset moving parameters includes:

adjusting, based on the preset moving parameters, a position of the image acquisition unit, where the first position relationship between the light-transparent module and the sensing module is maintained.

In the method, preferably, the preset moving parameters identify a first pixel offset of the second image relative to the first image, where the process of obtaining a third image by processing the first image and the second image based on the moving parameters includes:

obtaining the third image by processing the first image and the second image based on the first pixel offset.

In the method, preferably, the process of obtaining a third image by processing the first image and the second image based on the moving parameters includes:

obtaining the third image by performing interpolation and jointing process to the first image and the second image based on the moving parameters, where the third resolution is greater than the first resolution.

The disclosure also provides an electronic device, the electronic device includes an image acquisition unit, the image acquisition unit includes a light-transparent module and a sensing module, and there is a first position relationship between the light-transparent module and the sensing module. The electronic device further includes:

a first image acquiring unit, configured to acquire a first image of a target scene acquired by the image acquisition unit, where image resolution of the first image is first resolution;

an image acquisition adjusting unit, configured to adjust the image acquisition unit based on the preset moving parameters;

a second image acquiring unit, configured to acquire a second image of the target scene acquired by the image acquisition unit; and a processing unit, configured to acquire a third image by processing the first image and the second image based on the moving parameters, where image resolution of the third image is third resolution and the third resolution is greater than the first resolution.

In the electronic device, preferably, the image acquisition adjusting unit includes:

a first adjusting subunit, configured to adjust, based on the preset moving parameters, a relative position between the light-transparent module and the sensing module in the image acquisition unit, thereby a second relationship is generated between the light-transparent module and the sensing module.

In the electronic device, preferably, photosensitive area of the sensing module is greater than light-transparent area of the light-transparent module.

In the electronic device, preferably, the image acquisition adjusting unit includes:

a second adjusting subunit, configured to adjust, based on the preset moving parameters, a position of the image acquisition unit, where the first position relationship between the light-transparent module and the sensing module is maintained.

In the electronic device, preferably, the preset moving parameters identify a first pixel offset of the second image relative to the first image.

The processing unit is specifically configured to acquire a third image by processing the first image and the second image based on the first pixel offset.

In the electronic device, preferably, the processing unit includes:

an image processing subunit, configured to acquire a third image by performing interpolation and jointing process to the first image and the second image based on the moving parameters, where the third resolution is greater than the first resolution.

It can be seen from above solution, the disclosure provides a data acquiring method and electronic device thereof. The electronic device includes an image acquisition unit, and the image acquisition unit is provided with a light-transparent module and a sensing module having a first position relationship with the light-transparent module. In the disclosure, after a first image of a target scene is acquired by the image acquisition unit, the image acquisition unit is adjusted based on pre-calculated moving parameters, and a second image of the target scene is acquired by the adjusted image acquisition unit, and then a third image, with a third resolution which is greater than first resolution of the first image, is acquired by processing the first image and the second image based on the moving parameters, thereby the resolution of the acquired image is improved and the target of the disclosure is obtained. In the disclosure, relative low image resolution, which is ultimately acquired due to limitation of photosensitive area for a sensor in an electronic device, is avoided, a final image with high resolution is acquired by processing intermediate images, wherein the intermediate images are acquired before and after the image acquisition unit is adjusted based on the moving parameters, thereby a final image with high resolution is acquired, and thereby image resolution acquired by the image acquisition unit is improved.

BRIEF DESCRIPTION OF THE DRAWINGS

To describe the technical solutions for the embodiments of the present disclosure more clearly, the following briefly describes the drawings involved in the embodiments of the present disclosure. Apparently, the drawings described below are some embodiments, not all embodiments, and the embodiments obtained by the persons of ordinary skill in the art without any creative effort fall within the scope of the application.

DETAILED DESCRIPTION OF THE EMBODIMENTS

Technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the present disclosure.

Figure 1:
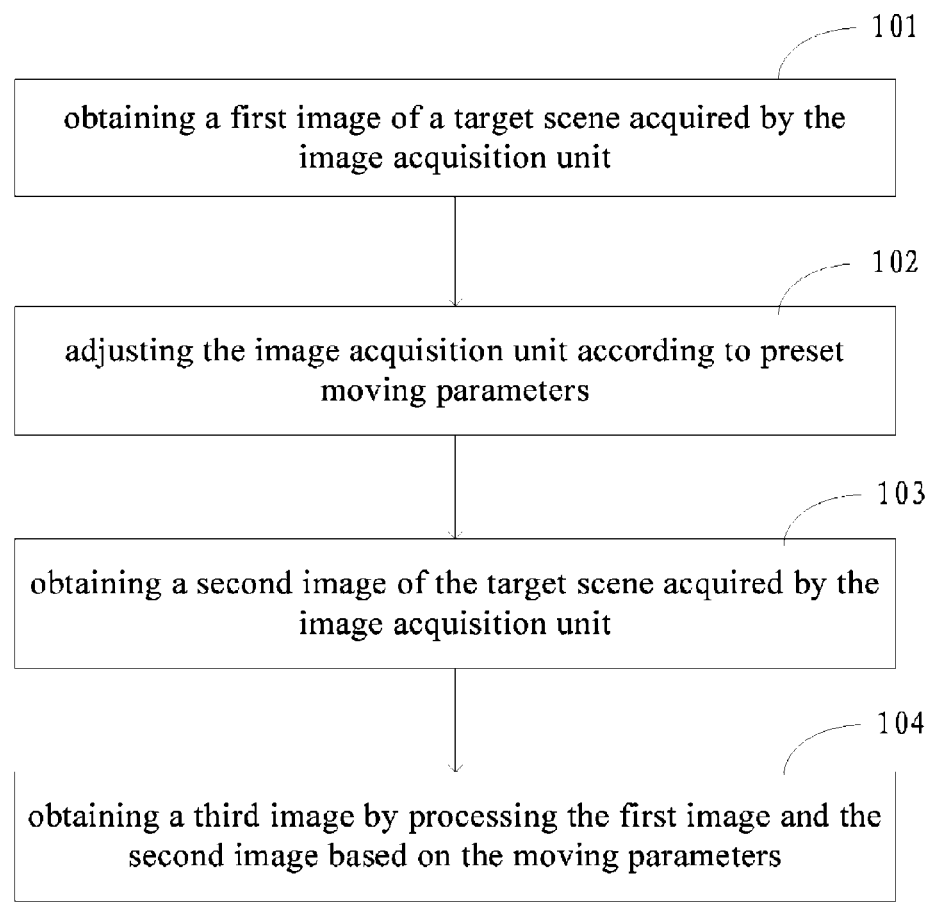
FIG. 1 is a flow chart of the first embodiment of a data acquiring method according to the disclosure.
Figure 2:
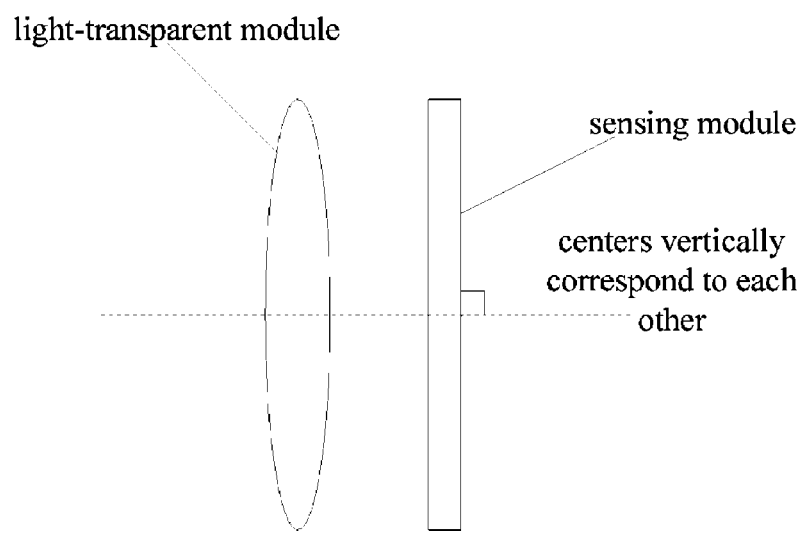
FIG. 2 is a diagram of an application example of the first embodiment according to the disclosure.

FIG. 1 is a flow chart of the first embodiment of a data acquiring method according to the disclosure. The method is applied to an electronic device, the electronic device includes an image acquisition unit, the image acquisition unit includes a light-transparent module and a sensing module, where the image acquisition unit may be a device such as a camera provided with a lens and a sensor, the electronic device may be a device such as a mobile phone, a pad or a DSC which is provided with the image acquisition unit such as a camera. Before capturing image by the image acquisition unit, there is a first position relationship between the light-transparent module and the sensing module, the first position relationship may be understood as a relative position relationship between the light-transparent module and the sensing module, for example, in a camera, the relative position relationship between the lens and the sensor may be that a center of a lens vertically corresponds to a center of a sensor, as shown in FIG. 2.

The method may include following steps.

Step 101: obtaining a first image of a target scene acquired by the image acquisition unit.

Image resolution of the first image is first resolution. The target scene represents a scene in front of the light-transparent module of the image acquisition unit, that is, the light-transparent module acquires light from the scene in front of the light-transparent module, thereby imaging in the sensing module and forming a first image.

Step 102: adjusting the image acquisition unit based on preset moving parameters.

The moving parameters may be preset, that is, moving parameters such as a moving direction of the whole image acquisition unit or a moving direction of a member inside the image acquisition unit and a moving distance value in the moving direction are preset in the electronic device;

Step 103: obtaining a second image of the target scene acquired by the image acquisition unit.

After the step 102, light of the target scene in front of a light-transparent module of the image acquisition unit is changed, therefore, a second image, which is acquired through imaging on the sensing module after obtaining the light in front of the light-transparent module by the light-transparent module, has a certain difference from the first image, but the second image and the first image are both images of the target scene.

Step 104: obtaining a third image by processing the first image and the second image based on the moving parameters.

Image resolution of the third image is third resolution, and the third resolution is greater than the first resolution.

It is should be illustrated that when the first image and the second image are processed based on the moving parameters in the step 104, operations such as composition may be performed to corresponding pixel points between the first image and the second image based on the moving parameters, so as to implement composition of two low-pixel images and acquire a third image, and thereby the third resolution of the third image is greater than the first resolution.

It can be seen from above solution, the disclosure provides the first embodiment of a data acquiring method, which is applied to an electronic device. The electronic device includes an image acquisition unit, and the image acquisition unit is provided with a light-transparent module and a sensing module having a first position relationship with the light-transparent module. In the disclosure, a first image of a target scene acquired by an image acquisition unit is acquired, the image acquisition unit is adjusted based on pre-calculated moving parameters, and a second image of the target scene is acquired by the adjusted image acquisition unit, then obtaining, by processing the first image and the second image based on the moving parameters, a third image of which third resolution is greater than first resolution of the first image, and thereby resolution of the acquired image is improved and the target of the disclosure is obtained. In the embodiment of the disclosure, relative low image resolution, which is finally acquired due to limitation of photosensitive area for a sensor in the electronic device, is avoided, a final image with high resolution is acquired by processing intermediate images, wherein the intermediate images are acquired before and after the image acquisition unit is adjusted based on the moving parameters by, thereby obtaining a final image with high resolution, so as to improve image resolution acquired by the image acquisition unit.

In above embodiment, the process of adjusting the image acquisition unit based on preset moving parameters in the step 102 includes:

adjusting, based on the preset moving parameters, a position of the light-transparent module relative to the sensing module in the image acquisition unit, thereby the light-transparent module and the sensing module have a second position relationship.

Figure 3:
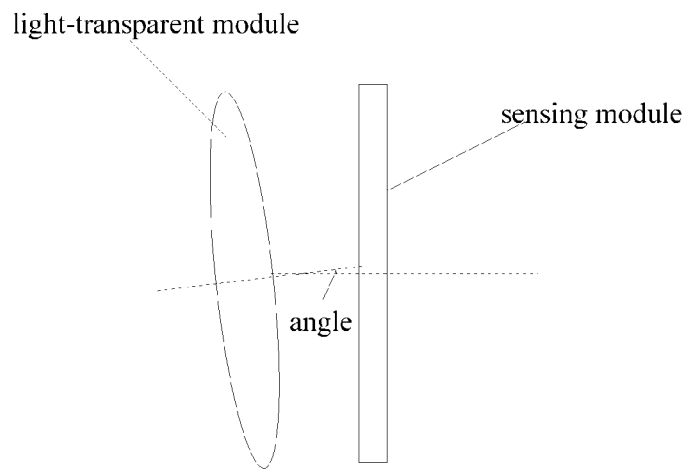
FIG. 3 is a diagram of another application example of the first embodiment according to the disclosure.

For example, distinguishing from a relationship shown in FIG. 2 in which a center of the light-transparent module corresponds to a center of the sensing module, in the second position relationship, distinguishing from parallel relationship, there is an angle between the light-transparent module and the sensing module, as shown in FIG. 3.

In the implementation, the moving parameters are parameters such as a moving direction between the light-transparent module and the sensing module and a moving distance value in the moving direction, that is, the process of adjusting the image acquisition unit in the step 102 represents that the light-transparent module or the sensing module is adjusted to move a distance of the moving distance value along the moving direction in the moving parameters to obtain a second position relationship between the light-transparent module and the sensing module, thereby a second image may be acquired in the step 103 and the step 104, thereby a process such as composition of the first image and the second image may be performed based on the moving direction and the moving distance value, and thereby obtaining a third image with high resolution.

It should be illustrated that in the step 102, when the relative position between the light-transparent module and the sensing module in the image acquisition unit is adjusted, it should be guaranteed that photosensitive area of the sensing module is greater than light-transparent area of the light-transparent module, that is, the moving parameters such as the moving direction and the moving distance value meet an imaging condition of the target scene, thus enabling, in the step 103, the light-transparent module of the image acquisition unit to acquire all light of the target scene to image in the sensing module and form a second image corresponding to the first image, so as to acquire, in the step 104, a third image with high resolution by processing the first image and the second image based on the moving direction and the moving distance value.

In addition, the process of adjusting the image acquisition unit based on preset moving parameters in the step 102 may be implemented through the following way:

adjusting, based on the preset moving parameters, a position of the image acquisition unit, where the first position relationship between the light-transparent module and the sensing module is maintained.

In the above implementation, the process of adjusting the position of the image acquisition unit may be understood as: adjusting the position of the image acquisition unit as a whole, including adjusting the light-transparent module and the sensing module simultaneously, and keeping the relative position between the light-transparent module and the sensing module unchanged, that is, the position relationship between them is still the first position relationship.

It should be illustrated that above implementation may be understood as: implementing a position adjustment of the image acquisition unit (similar to a tremor of a user to a camera in conventional technology) through mechanically dithering the image acquisition unit as a whole, moving parameters of the adjustment may be preset by the user, it should be emphasized that, dithering amplitude of mechanical dithering being much smaller than amplitude of a tremor of the user when a picture is taken, that is, the moving parameters meet an imaging condition of the target scene in the image acquisition unit. The imaging condition is that, after the image acquisition unit is adjusted, light of the target scene may still enter into the light-transparent module of the image acquisition unit, perform imaging on the sensing module and ensure that the second image and the first image are both images corresponding to the target scene, thereby a third image with a high pixel corresponding to the target scene can be obtained in the subsequent step 104.

In addition, in the above embodiments, the step 104 may be implemented as follows.

A third image is acquired by performing interpolation and jointing process to the first image and the second image based on the moving parameters.

The third resolution is greater than the first resolution.

Figure 4:
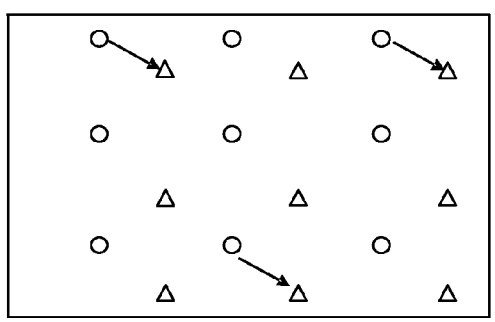
FIG. 4 is a diagram of another application example of the first embodiment according to the disclosure.

Implementation of the step 104 may be understood as: since the second image is an image obtained from the first image after the first image had moved the moving distance value in a moving direction, then in the step 104, every pixel point in the second image may be interpolated in the first image, which implementing that every pixel point of the second image is put into a relative position of a corresponding pixel point in the first image, as shown in FIG. 4, a circle pixel point being a pixel point of the first image, a triangle pixel point being a pixel point of the second image, the pixel point of the second image being inserted into corresponding pixel point of the first image based on the moving parameters such as the moving direction and the moving distance value, and the two images to which interpolation is implemented are jointed to acquire a third image, therefore, pixel points of the third image being apparently more than pixel points of the first image or pixel points of the second image, and clarity of the third pixel may not be affected.

It should be illustrated that the preset moving parameters identify a first pixel offset of the second image relative to the first image, in this case, the step 104 may be specifically implemented as follows.

A third image is acquired by processing the first image and the second image based on the first pixel offset.

The first pixel offset is an offset for each pixel point of the second image relative to corresponding pixel point of the first image.

For example, the first pixel offset is, in directions of parallel displacement values which are X and Y, 0.5~1 pixel displacement for each pixel point of the second image relative to corresponding pixel point of the first image, as shown in FIG. 4, there are two offsets of 0.5 pixel on X direction and Y direction respectively.

It should be illustrated that above embodiments are embodiments in which a third image with high resolution is acquired through one adjustment of the image acquisition unit, based on the spirit of the disclosure, two or more adjustments of the image acquisition unit may be made to acquire a plurality of low-resolution images of a target scene, thereby, by using implementation mode of the step 104, interpolating and jointing the low-resolution images are performed based on the moving parameters of each corresponding adjustment, thereby resolution of the image is further improved and the target of the disclosure is obtained.

Figure 5:
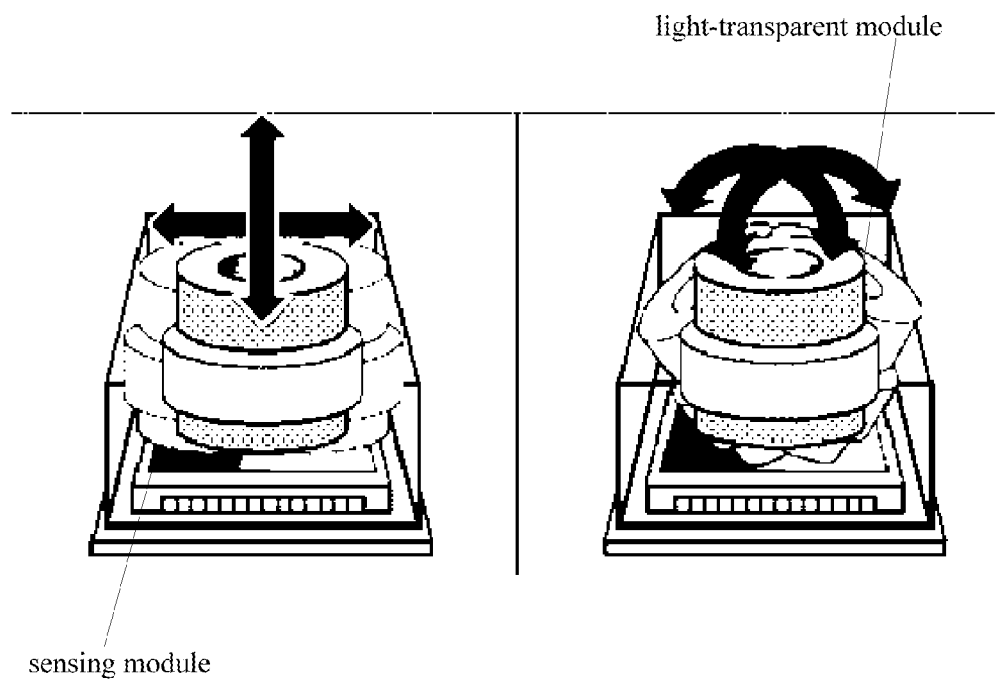
FIG. 5 is a diagram of another application example of the first embodiment according to the disclosure.

In above case that a plurality of adjustments of the image acquisition unit is employed, the moving parameters may be a plurality of moving directions and corresponding moving distance values in each moving direction. It should be illustrated that the a plurality of adjustments of the image acquisition unit may either include adjusting a position of the image acquisition unit as a whole for a plurality of times, or adjusting a relative relationship between the light-transparent module and the sensing module in the image acquisition unit for a plurality of times, here, as shown in FIG. 5, while the sensing module is kept still, the position of the light-transparent module may be adjusted forth and back, left and right or adjusted with other angles to implement adjustments of the image acquisition unit, thereby acquisition of a plurality of images for the target scene is implemented and finally a high-resolution image is acquired.

For example, the first pixel offset is, in directions of parallel displacement values which are X and Y, 0.5~1 pixel displacement for each pixel point of the second image relative to corresponding pixel point of the first image. For obtaining a high-resolution image by processing a plurality of images, there may be an image with 0.5 pixel offset in X direction, and an image with 0.5 pixel offset in Y direction. Wherein the first pixel offset is not limited to 0.5 pixel in the embodiment.

Figure 6:
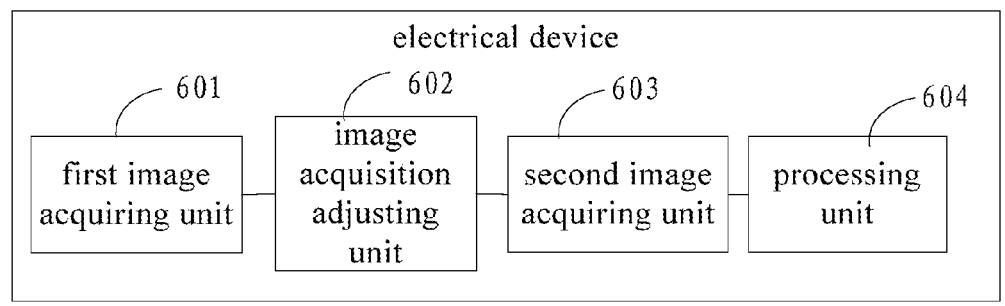
FIG. 6 is a schematic diagram of a structure of the second embodiment of an electronic device according to the disclosure.

FIG. 6 is a flow chart of a structure of a second embodiment of an electronic device according to the disclosure. The electronic device includes an image acquisition unit, the image acquisition unit includes a light-transparent module and a sensing module, where the image acquisition unit may be a device such as a camera provided with a lens and a sensor, the electronic device may be a device such as a mobile phone, a pad or a DSC, which is provided with the image acquisition unit such as a camera. Before capturing image by the image acquisition unit, there is a first position relationship between the light-transparent module and the sensing module, the first position relationship may be understood as a relative position relationship between the light-transparent module and the sensing module, for example, in a camera, a first relationship between a lens and a sensor may be a relative position relationship in which a center of the lens corresponds to a center of the sensor, as shown in FIG. 2.

The electronic device may also include:

a first image acquiring unit 601, configured to acquire a first image of a target scene acquired by the image acquisition unit, where image resolution of the first image is first resolution. The target scene represents a scene in front of the light-transparent module of the image acquisition unit, that is, the light-transparent module acquires light from the scene in front of the light-transparent module, thereby imaging in the sensing module is performed and a first image is formed;

an image acquisition adjusting unit 602, configured to adjust the image acquisition unit based on preset moving parameters, where the moving parameters may be preset, that is, moving parameters such as a moving direction of the whole image acquisition unit or a moving direction of a member inside the image acquisition unit, and a moving distance value in the moving direction, are preset in the electronic device;

a second image acquiring unit 603, configured to acquire a second image of a target scene acquired by the image acquisition unit, wherein after the image acquisition adjusting unit 602 completes its operation, light of the target scene in front of a light-transparent module of the image acquisition unit is changed, therefore, a second image, which is acquired by the second image acquiring unit 603 through imaging on the sensing module after obtaining the light in front of the light-transparent module by the light-transparent module, has a certain difference from the first image, but the second image and the first image are both images of the target scene; and a processing unit 604, configured to acquire a third image by processing the first image and the second image based on the moving parameters, where image resolution of the third image is a third resolution, the third resolution is greater than the first resolution.

It is should be illustrated that when the first image and the second image are processed based on the moving parameters by the processing unit 604, operations such as composition may be performed to corresponding pixel points between the first image and the second image based on the moving parameters, so as to implement composition of two low-pixel images and acquire a third image, and thereby third resolution of the third image is greater than the first resolution.

It can be seen from above solution, the disclosure provides a second embodiment of the electronic device. The electronic device includes an image acquisition unit, and the image acquisition unit is provided with a light-transparent module and a sensing module having a first position relationship with the light-transparent module. In the disclosure, after a first image of a target scene is acquired by an image acquisition unit, the image acquisition unit is adjusted based on pre-calculated moving parameters, and a second image of the target scene is acquired by the adjusted image acquisition unit, thereby a third image, with a third resolution which is greater than a first resolution of the first image, is acquired by processing the first image and the second image based on the moving parameters, thereby resolution of the acquired image is improved and the target of the embodiment of the disclosure is obtained. In the embodiment of the disclosure, relative low image resolution, which is finally acquired due to limitation of photosensitive area for a sensor in the electronic device, is avoided, a final image with high resolution is acquired by processing intermediate images, wherein the intermediate images are acquired before and after adjusting the image acquisition unit based on the moving parameters, thereby a final image with high resolution is acquired, and image resolution acquired by the image acquisition unit is improved.

Figure 7:
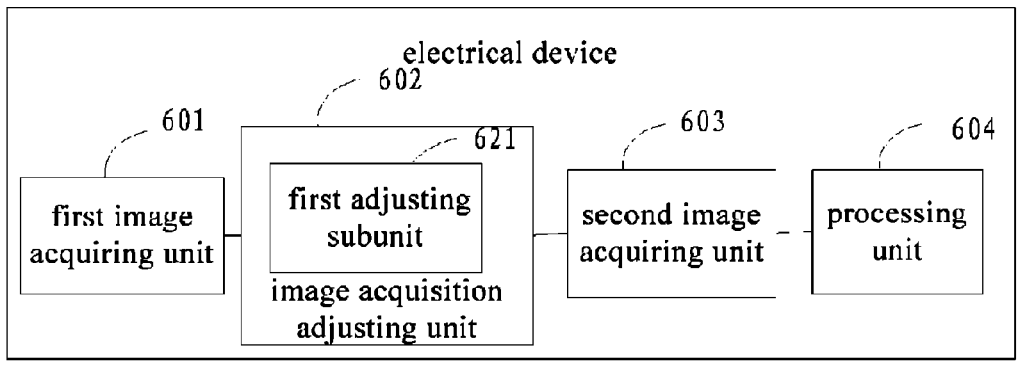
FIG. 7 is a schematic diagram of a structure of the third embodiment of an electronic device according to the disclosure.

FIG. 7 is a schematic diagram of a structure of a third embodiment of an electronic device according to the disclosure, where the image acquisition adjusting unit 602 may include:

a first adjusting subunit 621, configured to adjust, based on the preset moving parameters, a relative position between the light-transparent module and the sensing module in the image acquisition unit, and thereby a second relationship is generated between the light-transparent module and the sensing module.

For example, distinguishing from a relationship shown in FIG. 2 in which a center of the light-transparent module corresponds to a center of the sensing module, in the second position relationship, distinguishing from parallel relationship, there is an angle between the light-transparent module and the sensing module, as shown in FIG. 3.

In the first adjusting subunit 621, the moving parameters are parameters such as a moving direction between the light-transparent module and the sensing module and a moving distance value in the moving direction, that is, the process of adjusting the image acquisition unit by the image acquisition adjusting unit 602 represents that the light-transparent module or the sensing module is adjusted to move a distance of the moving distance value along the moving direction of the moving parameters, then the light-transparent module and the sensing module are rendered to have a second position relationship, thereby a second image can be acquired by the second image acquiring unit 603 and the processing unit 604, and then a process such as composition is performed to the first image and the second image based on the moving direction and the moving distance value to acquire a third image with high resolution.

It should be illustrated that when the relative position between the light-transparent module and the sensing module in the image acquisition unit is adjusted by the image acquisition adjusting unit 602, it should be guaranteed that photosensitive area of the sensing module is greater than light-transparent area of the light-transparent module, that is, the moving parameters such as the moving direction and the moving distance value in the moving direction shall meet an imaging condition of the target scene, thus the second image acquiring unit 603 is enabled to use the light-transparent module of the image acquisition unit to collect all light in the target scene to image in the sensing module and form a second image corresponding to the first image, so as to acquire, by the processing unit 604, a third image with high resolution by processing the first image and the second image based on the moving direction and the moving distance value.

Figure 8:
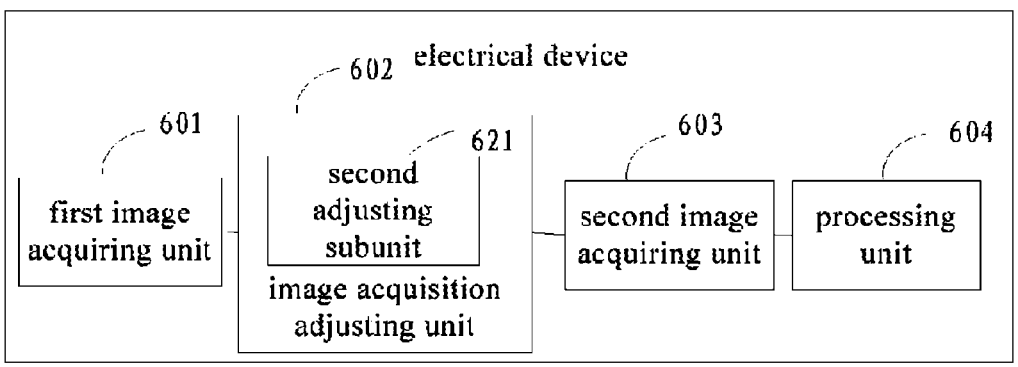
FIG. 8 is a schematic diagram of a structure of the fourth embodiment of an electronic device according to the disclosure.

FIG. 8 is a schematic diagram of a structure of a fourth embodiment of an electronic device according to the disclosure, where the image acquisition adjusting unit 602 may also include:

a second adjusting subunit 622, configured to adjust, based on preset moving parameters, a position of the image acquisition unit, where a first position relationship between the light-transparent module and the sensing module is maintained, where in the second adjusting subunit 622, the process of adjusting a position of the image acquisition unit may be understood as: adjusting a position of the image acquisition unit as a whole, including adjusting the light-transparent module and the sensing module simultaneously, and keeping the relative position between the light-transparent module and the sensing module consistent unchanged, that is to say, the position relationship between them is still the first position relationship.

It should be illustrated that above implementation of the second adjusting subunit 622 may be understood as: implementing a position adjustment of the image acquisition unit (similar to a tremor of a user to a camera in conventional technology) through mechanically dithering the image acquisition unit as a whole, moving parameters of the adjustment may be preset by the user, it should be emphasized that, dithering amplitude of mechanical dithering here is much smaller than amplitude of the tremor for the user when a picture is taken, that is, the moving parameters meet the imaging condition of the target scene in the image acquisition unit, that is, after the image acquisition unit is adjusted, light of the target scene may still enter via the light-transparent module of the image acquisition unit, and then performs imaging on the sensing module and it is ensured that the second image and the first image are both images corresponding to the target scene, and therefore, the processing unit 604 may acquire a third image with a high pixel corresponding to the target scene.

Figure 9:
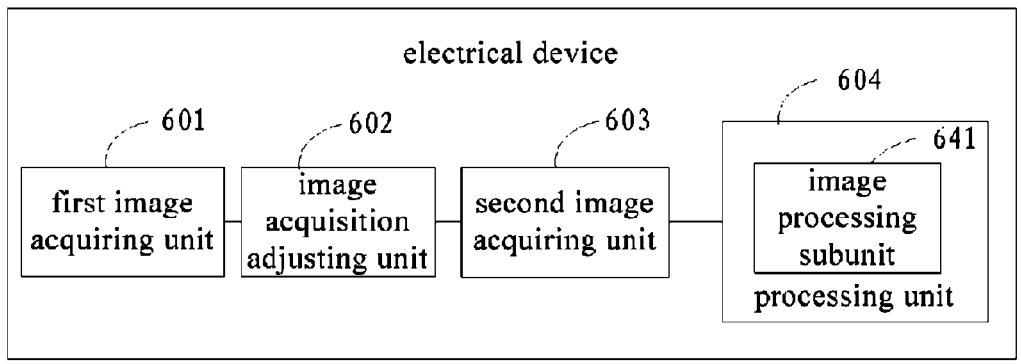
FIG. 9 is a schematic diagram of a structure of the fifth embodiment of an electronic device according to the disclosure.

FIG. 9 is a schematic diagram of a structure of a fifth embodiment of an electronic device according to the disclosure, where the processing unit 604 includes:

an image processing subunit 641, configured to acquire a third image by performing interpolation and jointing process to the first image and the second image based on the moving parameters, wherein the third resolution is greater than the first resolution.

It should be illustrated that the process in which the processing unit 604 implements its functions through using the image processing subunit 641 may be understood as: the second image is an image obtained after the first image have been moved a moving distance value in a moving direction, and then every pixel point in the second image may be interpolated in the first image by the processing unit 604, so it is implemented that every pixel point of the second image is put into a relative position of a corresponding pixel point in the first image, as shown in FIG. 4, a circle pixel point is a pixel point of the first image, a triangle pixel point is a pixel point of the second image, the pixel point of the second image is inserted into corresponding pixel point of the first image based on the moving direction and the moving distance value of the moving parameters, and the two images for which interpolation have been performed are composed to acquire a third image, therefore, pixel points of the third image is obviously more than pixel points of the first image or the second image, and clarity of the third pixel may not be affected.

It should be illustrated that the preset moving parameters identify a first pixel offset of the second image relative to the first image, and in this case, the processing unit 604 may be specifically implemented as follows.

A third image is acquired by processing the first image and the second image based on the first pixel offset, where, the first pixel offset is an offset for each pixel point of the second image relative to corresponding pixel point of the first image.

For example, the first pixel offset is, in directions of parallel displacement values which are X and Y, 0.5~1 pixel displacement for each pixel point of the second image relative to corresponding pixel point of the first image, as shown in FIG. 4, there are two offsets of 0.5 pixel on X direction and Y direction respectively.

It should be illustrated that above embodiments are implementation embodiments in which a third image with high resolution is acquired through an adjustment of the image acquisition unit, based on the spirit of the disclosure, two or more adjustments of the image acquisition unit may be made to acquire a plurality of low-resolution images, thereby, by using implementation construction of the processing unit 604, interpolating and jointing are performed to the low-resolution images based on moving parameters of each corresponding adjustment, thereby resolution of the image is further improved and the target of the disclosure is obtained.

In the a plurality of adjustments of the image acquisition unit as above, the moving parameters may be a plurality of moving directions and corresponding moving distance values in each moving direction. It should be illustrated that the a plurality of adjustments of the image acquisition unit may either include adjusting a position of the image acquisition unit as a whole for a plurality of times or adjusting a relative relationship between the light-transparent module and the sensing module in the image acquisition unit for a plurality of times, here, as shown in FIG. 5, the sensing module may be kept still, a position of the light-transparent module may be adjusted forth and back, left and right or adjusted with other angles to implement an adjustment of the image acquisition unit, thereby a plurality of images of the target scene is acquired and finally a high-resolution image is acquired.

For example, the first pixel offset is, in directions of parallel displacement values which are X and Y, 0.5~1 pixel displacement for each pixel point of the second image relative to corresponding pixel point of the first image, upon obtaining a high-resolution image by processing a plurality of images, there may be an image with 0.5 pixel offset in X direction, and an image with 0.5 pixel offset in Y direction, where the first pixel offset is not limited to 0.5 pixel in the embodiment.

It should be illustrated that the embodiments of the present disclosure are described in a progressive manner, and each embodiment places emphasis on its difference from other embodiments, therefore, one embodiment can refer to other embodiments for the same or similar parts.

Finally, it should also be illustrated that a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

A data processing method and an electronic device provided by the disclosure are introduced in detail above, Various modifications made to these embodiments are apparent for persons skilled in the art, and a normal principle defined in the disclosure may be implemented in other embodiments without departing from spirit or scope of the disclosure. Therefore the disclosure is not limited to the embodiments described in the disclosure but is conformed to a widest scope in accordance with principles and novel features disclosed in the disclosure.

The invention claimed is:

1. A data acquiring method, wherein the method is applied to an electronic device, the electronic device comprises an image acquisition unit, the image acquisition unit comprises a light-transparent module and a sensing module, and there is a first position relationship between the light-transparent module and the sensing module, the method comprising:
   obtaining a first image of a target scene acquired by the image acquisition unit, wherein image resolution of the first image is first resolution;
   adjusting the image acquisition unit based on preset moving parameters;
   obtaining a second image of the target scene acquired by the image acquisition unit; and
   obtaining a third image by processing the first image and the second image based on the preset moving parameters, wherein image resolution of the third image is third resolution and the third resolution is greater than the first resolution;
   wherein the preset moving parameters is a first pixel offset of the second image relative to the first image, the first pixel offset is parallel displacement values for each pixel point of the second image relative to corresponding pixel point of the first image taken from a same point in the target scene; and
   wherein the obtaining a third image by processing the first image and the second image based on the preset moving parameters comprises:
   obtaining a third image by processing the first image and the second image based on the first pixel offset.

2. The method according to claim 1, wherein the adjusting the image acquisition unit based on preset moving parameters comprises:
   adjusting, based on preset moving parameters, a position of the light-transparent module relative to the sensing module in the image acquisition unit, generating a second position relationship between the light-transparent module and the sensing module.

3. The method according to claim 2, wherein photosensitive area of the sensing module is greater than light-transparent area of the light-transparent module.

4. The method according to claim 1, wherein the adjusting the image acquisition unit based on preset moving parameters comprises:
   adjusting, based on preset moving parameters, a position of the image acquisition unit, wherein the first position relationship between the light-transparent module and the sensing module is maintained.

5. The method according to claim 1, wherein the obtaining a third image by processing the first image and the second image based on the preset moving parameters comprises:
   obtaining a third image by performing interpolation and jointing process to the first image and the second image based on the preset moving parameters, wherein the third resolution is greater than the first resolution.

6. The method according to claim 1, wherein the obtaining a third image by processing the first image and the second image based on the preset moving parameters comprises:
   obtaining a third image by inserting the pixel point of the second image into corresponding pixel point of the first image based on moving direction and moving distance value of the preset moving parameters, and composing two images for which interpolation have been performed to acquire a third image, wherein the first pixel offset is an offset for each pixel point of the second image relative to corresponding pixel point of the first image taken from a same point in the target scene.

7. An electronic device, wherein the electronic device comprises an image acquisition unit, the image acquisition unit comprises a light-transparent module and a sensing module, and there is a first position relationship between the light-transparent module and the sensing module, the electronic device further comprising following units implemented by a processor contained in the electronic device:

a first image acquiring unit, configured to acquire the first image of a target scene acquired by the image acquisition unit, wherein image resolution of the first image is first resolution;

an image acquisition adjusting unit, configured to adjust the image acquisition unit based on preset moving parameters;

a second image acquiring unit, configured to acquire a second image of the target scene acquired by the image acquisition unit; and a processing unit, configured to acquire a third image by processing the first image and the second image based on the preset moving parameters, wherein image resolution of the third image is third resolution and the third resolution is greater than the first resolution; and wherein the preset moving parameters is a first pixel offset of the second image relative to the first image, and the third image is acquired by processing the first image and the second image based on the first pixel offset, wherein the first pixel offset is parallel displacement values for each pixel point of the second image relative to corresponding pixel point of the first image taken from a same point in the target scene.

8. The electronic device according to claim 7, wherein the image acquisition adjusting unit comprises:

a first adjusting subunit, configured to adjust, based on the preset moving parameters, a relative position between the light-transparent module and the sensing module in the image acquisition unit, to generate a second relationship between the light-transparent module and the sensing module.

9. The electronic device according to claim 8, wherein photosensitive area of the sensing module is greater than light-transparent area of the light-transparent module.

10. The electronic device according to claim 7, wherein the image acquisition adjusting unit comprises:

a second adjusting subunit, configured to adjust, based on the preset moving parameters, a position of the image acquisition unit, wherein the first position relationship between the light-transparent module and the sensing module is maintained.

11. The electronic device according to claim 8, wherein the preset moving parameters identify a first pixel offset of the second image relative to the first image, and the processing unit is configured to acquire a third image by processing the first image and the second image based on the first pixel offset.

12. The electronic device according to claim 7, wherein the processing unit comprises: an image processing subunit, configured to acquire a third image by performing interpolation and jointing process to the first image and the second image based on the preset moving parameters, wherein the third resolution is greater than the first resolution.

* * * * *